United States Patent
Pietron et al.

(10) Patent No.: US 10,180,186 B2
(45) Date of Patent: *Jan. 15, 2019

(54) TRANSMISSION AND METHOD OF CONTROLLING CLUTCH DURING RATIO CHANGE

(71) Applicant: Ford Global Technologies, LLC, Dearborn, MI (US)

(72) Inventors: Gregory Michael Pietron, Canton, MI (US); Yuji Fujii, Ann Arbor, MI (US); Joseph F. Kucharski, Livonia, MI (US); Nicholas Joseph Witte, Wixom, MI (US); Stephen Michael Cicala, Dearborn Heights, MI (US); Bradley Dean Riedle, Northville, MI (US); Diana Yanakiev, Birmingham, MI (US); Nimrod Kapas, Canton, MI (US); Davorin David Hrovat, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/135,279

(22) Filed: Apr. 21, 2016

(65) Prior Publication Data
US 2016/0230882 A1    Aug. 11, 2016

Related U.S. Application Data

(63) Continuation of application No. 14/458,434, filed on Aug. 13, 2014, now Pat. No. 9,360,107, which is a
(Continued)

(51) Int. Cl.
*F16H 59/14*    (2006.01)
*F16H 59/16*    (2006.01)
(Continued)

(52) U.S. Cl.
CPC ........... *F16H 61/061* (2013.01); *F16H 3/006* (2013.01); *F16H 3/66* (2013.01); *F16H 59/16* (2013.01);
(Continued)

(58) Field of Classification Search
CPC .. F16H 59/16; F16H 2059/148; F16H 61/061; F16H 2061/0087; F16H 2306/40; F16H 2342/044
(Continued)

(56) References Cited

U.S. PATENT DOCUMENTS 4,220,058 A * 9/1980 Petzold ................. F16H 61/061
                                                                192/15
4,360,092 A   11/1982 Mueller et al.
(Continued)

FOREIGN PATENT DOCUMENTS

CN    101844557 A    9/2010
CN    102022529 A    4/2011
(Continued)

OTHER PUBLICATIONS

English language machine translation of JP 2012-82853 A, retrieved from JPO Advanced Industrial Property Network (AIPN) website on Aug. 2, 2018.*

(Continued)

*Primary Examiner* — Richard M Lorence
(74) *Attorney, Agent, or Firm* — James Dottavio; Brooks Kushman P.C.

(57) ABSTRACT

A transmission and control method are disclosed which ensure proper stroke pressure and minimize torque transients during a shift event. The transmission includes a clutch having a torque capacity based on a fluid pressure, a torque sensor adapted to measure a torque value that varies in relationship to the torque capacity, and a controller. The
(Continued)

method includes varying the fluid pressure around a predetermined value, measuring a resulting torque difference with the torque sensor, and adjusting a clutch control parameter if the resulting torque difference is less than a threshold value.

20 Claims, 10 Drawing Sheets

Related U.S. Application Data continuation of application No. 13/613,726, filed on Sep. 13, 2012, now Pat. No. 8,827,060.

(51) Int. Cl.
*F16H 61/00* (2006.01)
*F16H 61/06* (2006.01)
*F16H 3/00* (2006.01)
*F16H 3/66* (2006.01)

(52) U.S. Cl.
CPC .. *F16H 2003/007* (2013.01); *F16H 2059/148* (2013.01); *F16H 2061/0087* (2013.01); *F16H 2200/0052* (2013.01); *F16H 2200/201* (2013.01); *F16H 2200/2043* (2013.01); *F16H 2306/40* (2013.01); *F16H 2342/044* (2013.01)

(58) Field of Classification Search
USPC .......... 192/3.58, 48.601, 54.3, 85.63, 109 F; 475/125; 701/51, 58, 60, 67, 68
See application file for complete search history.

(56) References Cited

U.S. PATENT DOCUMENTS

| | | |
|---|---|---|
| 4,693,141 A | 9/1987 | Iwanaga |
| 4,724,723 A | 2/1988 | Lockhart et al. |
| 4,744,031 A | 5/1988 | Takeda et al. |
| 4,790,418 A | 12/1988 | Brown et al. |
| 4,792,902 A | 12/1988 | Hrovat et al. |
| 4,855,914 A | 8/1989 | Davis et al. |
| 4,860,860 A | 8/1989 | Furuya et al. |
| 4,881,453 A | 11/1989 | Armstrong |
| 4,887,461 A | 12/1989 | Sugimoto et al. |
| 4,899,597 A | 2/1990 | Yagi et al. |
| 5,058,015 A | 10/1991 | Leorat |
| 5,092,182 A | 3/1992 | Ikeda et al. |
| 5,105,357 A | 4/1992 | Steeby |
| 5,133,227 A | 7/1992 | Iwatsuki |
| 5,165,286 A | 11/1992 | Hamamura et al. |
| 5,445,246 A | 8/1995 | Haka et al. |
| 5,474,158 A | 12/1995 | Fukasawa et al. |
| 5,669,851 A | 9/1997 | Tietze |
| 5,785,627 A | 7/1998 | Uno et al. |
| 5,842,947 A | 12/1998 | Weilant |
| 6,110,068 A | 8/2000 | Kraska |
| 6,278,926 B1 | 8/2001 | Jain et al. |
| 6,698,299 B2 | 3/2004 | Cripe |
| 6,846,260 B2 | 1/2005 | Horiuchi |
| 6,991,584 B2 | 1/2006 | Cowan |
| 7,066,305 B2 | 6/2006 | Grzesiak et al. |
| 7,178,618 B2 | 2/2007 | Komeda et al. |
| 7,243,557 B2 | 7/2007 | May |
| 7,300,381 B2 | 11/2007 | Badillo et al. |
| 7,351,183 B2 | 4/2008 | Fujii et al. |
| 7,478,572 B2 | 1/2009 | Maten et al. |
| 7,503,875 B2 | 3/2009 | Fujii et al. |
| 8,290,668 B2 | 10/2012 | Hirasako et al. |
| 8,489,298 B2 | 7/2013 | Otanez et al. |
| 8,636,613 B2 | 1/2014 | Tesiak et al. |
| 8,798,889 B2 | 8/2014 | Fujii et al. |
| 8,827,060 B2 | 9/2014 | Pietron |
| 8,882,632 B2 | 11/2014 | Kumazaki et al. |
| 8,948,989 B2 | 2/2015 | Saitoh |
| 9,260,102 B2 * | 2/2016 | Teslak .............. F16H 59/16 |
| 9,360,107 B2 * | 6/2016 | Pietron ............. F16H 61/061 |
| 2002/0025885 A1 | 2/2002 | Saito et al. |
| 2004/0043867 A1 | 3/2004 | Sato et al. |
| 2004/0242374 A1 | 12/2004 | Wheals |
| 2005/0109564 A1 | 5/2005 | Bai et al. |
| 2006/0135316 A1 | 6/2006 | Fujii et al. |
| 2008/0220937 A1 | 9/2008 | Nozaki et al. |
| 2009/0247344 A1 | 10/2009 | Kubo |
| 2010/0262344 A1 | 10/2010 | Fujii et al. |
| 2010/0318269 A1 | 12/2010 | Yanakiev et al. |
| 2011/0184612 A1 | 7/2011 | Fujii et al. |

FOREIGN PATENT DOCUMENTS

| | | |
|---|---|---|
| CN | 102563034 B | 11/2015 |
| EP | 2325513 A2 | 5/2011 |
| JP | 3752435 B2 | 3/2006 |
| JP | 201282853 A | 10/2013 |
| WO | 2011161757 A1 | 12/2011 |
| WO | 2012056540 A1 | 5/2012 |

OTHER PUBLICATIONS

Chinese Office Action issued in corresponding case No. CN 201310418809; dated Jul. 20, 2016; 5 pages.
Chinese Office Action issued in corresponding case No. CN 201611183640; dated Apr. 25, 2018; 6 pages.

* cited by examiner

TRANSMISSION AND METHOD OF CONTROLLING CLUTCH DURING RATIO CHANGE

CROSS-REFERENCE TO RELATED APPLICATION

This application is a Continuation of U.S. Ser. No. 14/458,434 filed Aug. 13, 2015, and now issued as U.S. Pat. No. 9,360,107, which is a Continuation of U.S. Ser. No. 13/613,726, filed Sept. 13, 2012, and issued as U.S. Pat. No. 8,827,060, the disclosures of which are incorporated in their entirety by reference herein.

TECHNICAL FIELD

The present disclosure relates to a system and method to control ratio changes in an automatic vehicle transmission.

BACKGROUND

Known automatic transmissions for automotive vehicles include step ratio controls for effecting speed ratio changes in response to changing driving conditions. The term "speed ratio", for purposes of this description, is defined as transmission input shaft speed divided by transmission output shaft speed.

An upshift occurs when the driving conditions require a ratio change from a lower numbered ratio (high speed ratio) to a higher number ratio (low speed ratio) in the transmission gearing. Similarly, a downshift occurs when the driving conditions require a ratio change from a higher numbered ratio (low speed ratio) to a lower number ratio (high speed ratio). The gearing can include, for example, either a planetary type gear system or a lay shaft type gear system. An automatic gear ratio shift is achieved by friction torque establishing devices, such as multiple disk clutches and multiple disk brakes. The friction torque establishing devices include friction elements, such as multiple plate clutches and band brakes, which can be actuated hydraulically.

A step-ratio automatic transmission uses multiple friction elements for automatic gear ratio shifting. A ratio change occurs in a synchronous clutch-to-clutch shift as one friction element, which may be referred to as the oncoming clutch (OCC), is engaged and a second friction element, which may be referred to as the off-going clutch (OGC), is disengaged. Failure to properly coordinate the engagement of the OCC with the disengagement of the OGC can be perceived by the vehicle occupants as an unpleasant shift event. More particularly, early engagement of the OCC relative to the release of the OGC can result in a phenomenon called tie-up. On the other hand, if the OCC is engaged too late relative to the release of the OGC, an engine flare can occur.

SUMMARY

In one embodiment, a method for controlling a transmission is provided. The method ensures proper clutch stroke and minimizes torque transients. During a downshift, a clutch pressure is set for an oncoming clutch at a predetermined stroke pressure. Then the clutch pressure is varied from the predetermined stroke pressure. A resulting torque difference is measured along a torque transmitting element with a torque sensor while the clutch pressure is varied. A clutch control parameter is adjusted if the resulting torque difference is less than a threshold value.

In another embodiment, the torque transmitting element can be, for example, an input shaft or an output shaft.

In yet another embodiment, varying the clutch pressure can involve pulsing the clutch pressure above the predetermined stroke pressure, pulsing the clutch pressure below the predetermined pressure, gradually increasing the clutch pressure in a ramp profile, or other means.

In some embodiments, the method can include setting the clutch pressure at a boost pressure higher than the predetermined stroke pressure for a boost duration before setting the clutch pressure at the predetermined stroke pressure.

In still another embodiment, the clutch control parameter to be adjusted can be, for example, the predetermined stroke pressure, the boost pressure, or the boost duration.

In one other embodiment, a method for controlling a transmission is provided. The method includes varying a clutch pressure around a predetermined value in advance of a torque phase of a shift event. A torque change is measured in a transmission element as the clutch pressure is varied. A clutch control parameter is adjusted in response to the measured torque change.

In another embodiment, the value can be increased if the change in measured torque is below a first threshold.

In another embodiment, the value can be decreased if the change in measured torque is above a second threshold.

In another embodiment, the shift event can be a downshift and the clutch can be the oncoming clutch for the downshift.

In on other embodiment, a transmission is provided. The transmission includes a clutch having a torque capacity based on a fluid pressure and a torque sensor adapted to measure a torque value that varies in relationship to the torque capacity. A transmission controller is configured to vary the fluid pressure from a predetermined value in advance of a torque phase of a shift event and adjust the predetermined value in response to a change in the measured torque value.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely examples of the invention that can be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
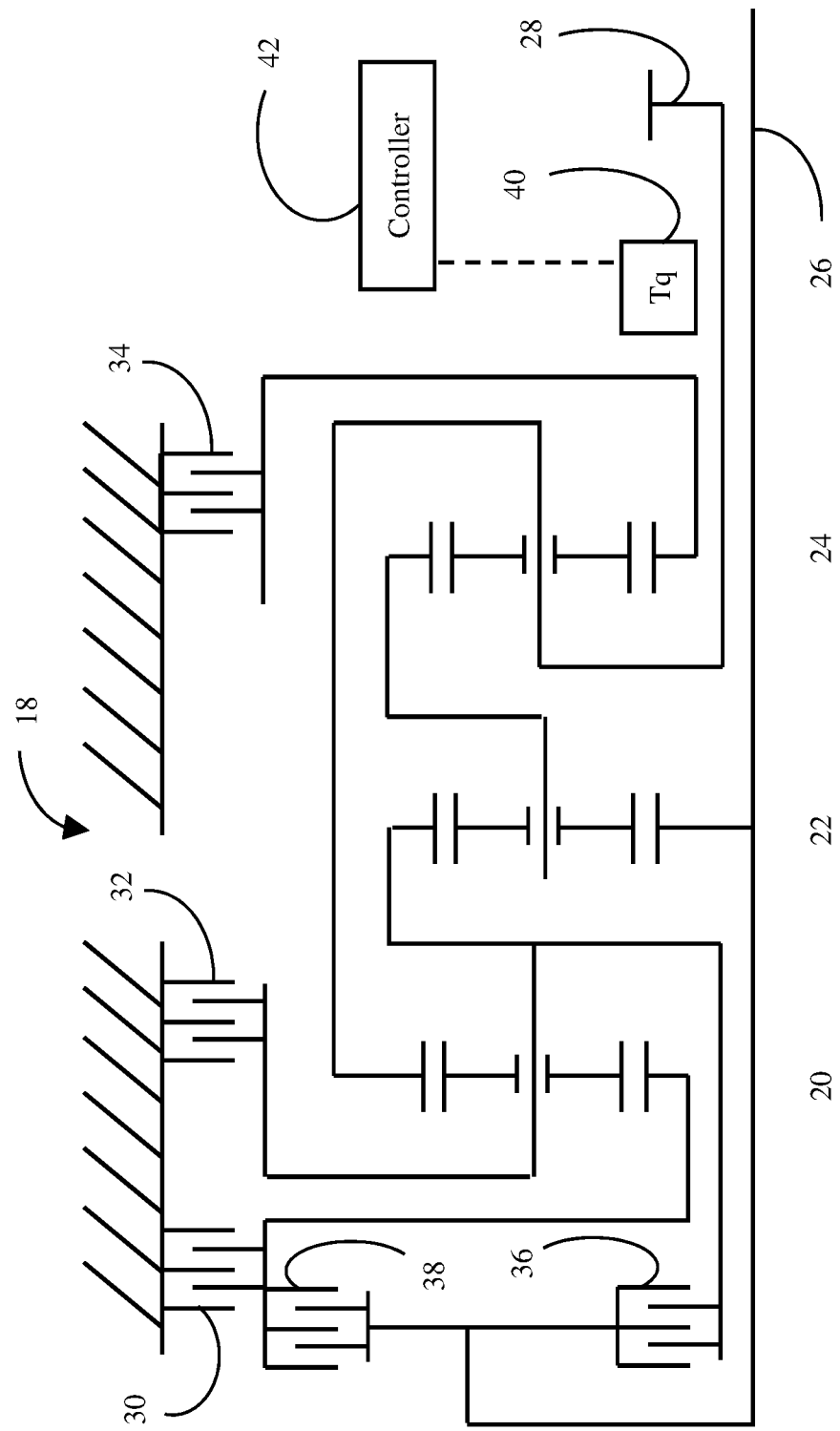
FIG. 1 is a schematic diagram illustrating a transmission.

FIG. 1 illustrates a six speed planetary transmission 18 with three planetary gear sets 20, 22, and 24. Each planetary gear set includes a sun gear, a ring gear, a planet carrier, and a collection of planet gears supported for rotation about the planet carrier and meshing with both the sun gear and the ring gear. The carrier of gear set 20 is fixedly connected to the ring gear of gear set 22, the carrier of gear set 22 is fixedly connected to the ring gear of gear set 24, and the carrier of gear set 24 is fixedly connected to the ring gear of gear set 20. Input shaft 26 is fixedly connected to the sun gear of gear set 22 and output shaft 28 is fixedly connected to the carrier of gear set 24.

Various power flow paths between input shaft 26 and output shaft 28 are established by the selective engagement of clutches and brakes. Brakes 30, 32, and 34 selectively hold the sun gear of gear set 20, the carrier of gear set 20, and the sun gear of gear set 24, respectively, against rotation. Clutches 36 and 38 selectively connect the sun gear of gear set 20 and the carrier of gear set 20, respectively, to input shaft 26. Table 1 indicates which clutches and brakes are engaged in order to establish each of the six forward and one reverse transmission ratios. Torque sensor 40 senses the torque transmitted to the output shaft and electrically communicates that information to controller 42. The controller 42 can, for example, be part of a vehicle system control module or transmission control module or can be a stand-alone controller.

TABLE 1

|  | Brake 30 | Brake 32 | Brake 34 | Clutch 36 | Clutch 38 |
|---|---|---|---|---|---|
| Reverse |  | X |  |  | X |
| 1st |  | X | X |  |  |
| 2nd | X |  | X |  |  |
| 3rd |  |  | X |  | X |
| 4th |  |  | X | X |  |
| 5th |  |  |  | X | X |
| 6th | X |  |  | X |  |

While an automatic transmission according to an embodiment of the disclosure can be a planetary type as shown in FIG. 1, it is also contemplated that the transmission can be a lay shaft type transmission. Similarly, a speed ratio change can be achieved by the friction elements as described above, or the friction elements can be plate clutches or band brakes.

Figure 2:
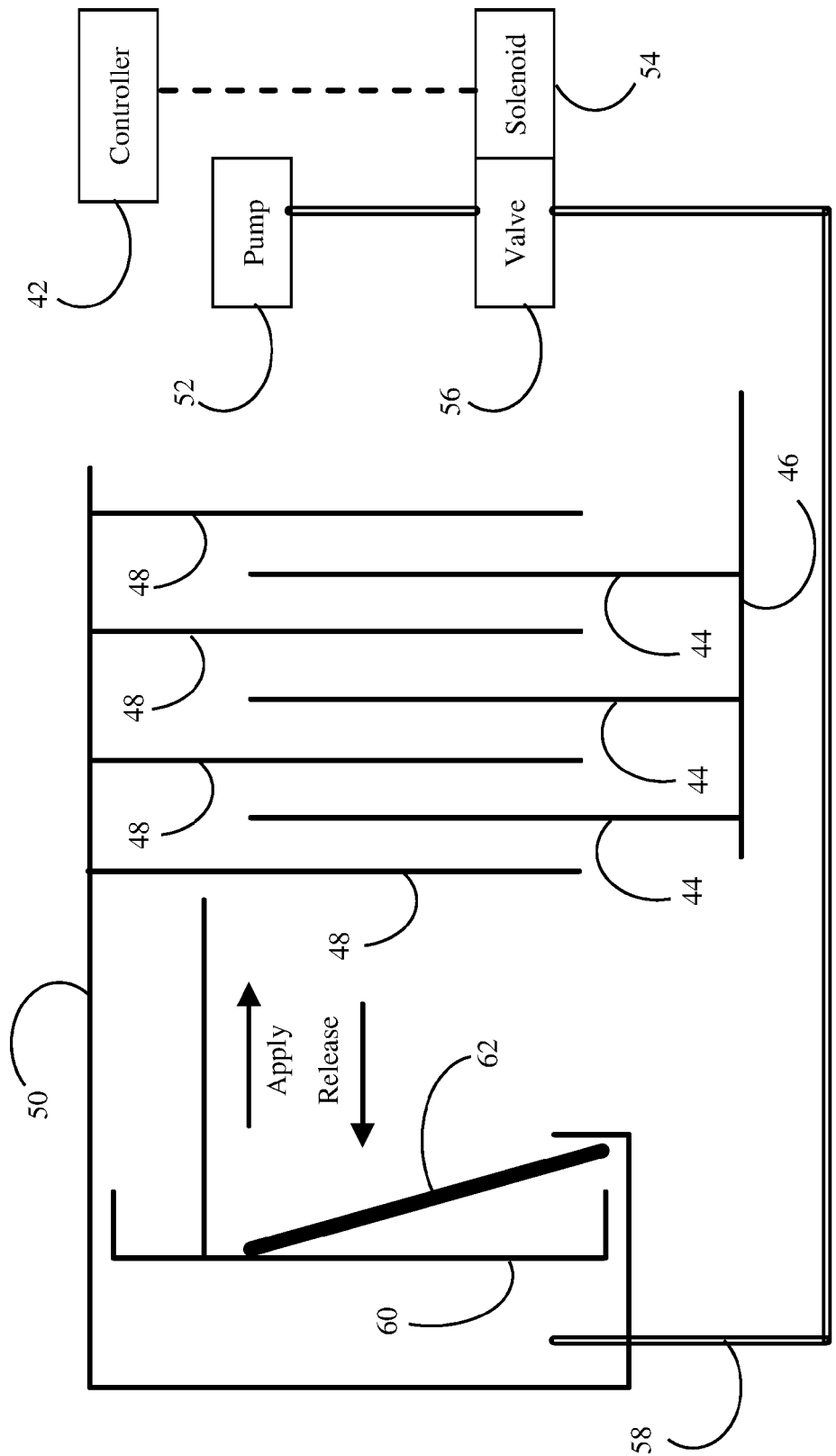
FIG. 2 is a schematic diagram of a transmission clutch or brake.

FIG. 2 illustrates a representative cross section of a clutch, such as clutches 36 and 38 and brakes 30, 32, and 34 in FIG. 1. A set of friction plates 44 is splined to a clutch hub 46. The friction plates 44 are interspersed with a set of separator plates 48 that is splined to a clutch cylinder 50. In the disengaged state as shown here in FIG. 2, there is space between the friction plates 44 and the separator plates 48 such that the hub 46 and the cylinder 50 are free to rotate at different speeds with respect to each other.

To engage the clutch, pressurized fluid is forced into the cylinder 50. The pressure is supplied by a pump 52. The controller 42 regulates the hydraulic pressure indirectly by setting an electrical current in a solenoid 54 which controls the position of a valve 56. The pressurized fluid travels through a hydraulic passageway 58 to the clutch cylinder 50. The pressurized fluid forces the piston 60 to slide within the cylinder 50 and squeeze the friction plates 44 and separator plates 48 together. Friction between the friction plates 44 and the separator plates 48 resists relative rotation of hub 46 and cylinder 50. When the fluid pressure is removed, a return spring 62 forces the piston 60 to slide in the opposite direction returning the clutch to the disengaged state.

The torque capacity of the clutch depends upon the fluid pressure but the relationship is complicated by several factors. First, there is a time delay between when fluid starts flowing to the cylinder 50 and when the piston 60 has moved far enough to start squeezing the friction plates 44 and separator plates 48 together. The torque capacity of the clutch is nearly zero during this period before the piston 60 is fully stroked. When the piston 60 has moved such that it can apply force to the plates 44, 48, the piston and clutch are said to be stroked. Secondly, some amount of pressure, called the stroke pressure, is required to overcome the force of the return spring 62 even after the piston 60 is stroked. Once the piston 60 is stroked, the clutch torque capacity is proportional to the fluid pressure minus the stroke pressure. However, a variety of unpredictable noise factors influence the relationship between the solenoid 54 current as commanded by the controller 42 and the torque capacity so that the commanded torque capacity may not be accurately achieved. For example, variations in the coefficient of friction, frictional forces between the piston 60 and the cylinder 50, and pressure variations in the passageway 58, may cause the actual torque capacity to be either higher or lower than commanded.

Figure 3:
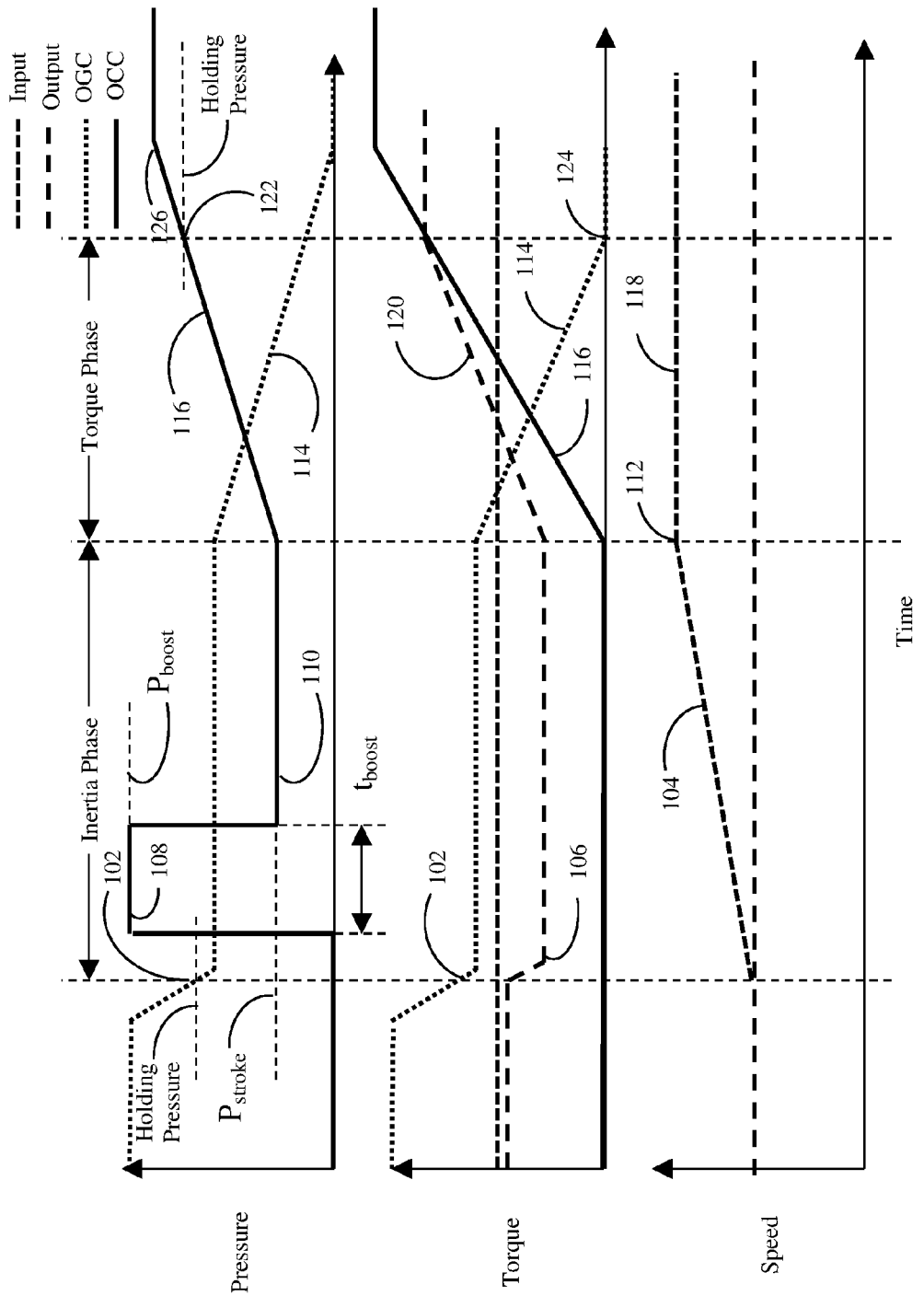
FIG. 3 is a graph illustrating a downshift under idealized clutch pressure control.

These noise factors can make it difficult to achieve a smooth shift behavior without torque transient conditions that may be perceptible to a driver. A downshift from one speed ratio to another requires the coordinated application of one clutch and release of another. For example, to shift from sixth gear to fifth gear, brake 30 (the OGC) is released while clutch 38 (the OCC) is applied, as described in Table 1. As discussed above, noise factors make it more difficult to achieve a smooth shift behavior using only open loop control strategies. The disturbances associated with pressure control inaccuracy are best understood in relation to the intended behavior which is illustrated in FIG. 3. As discussed below, actual control strategies do not repeatably achieve this behavior.

FIG. 3 illustrates how a downshift process would ideally be executed if there were no noise factors and the controller could command precisely the right amount of torque capacity. The holding pressure for the OGC would be set to the pressure at which the torque capacity of the OGC equals the torque carried by the OGC in the initial gear. To initiate the shift, the controller would reduces the pressure to the OGC to a level slightly below the holding pressure as shown at 102, marking the beginning of the inertia phase.

During the inertia phase, the input speed would increase to the correct multiple of the output speed for the destination ratio, as shown at 104. The output torque would drop slightly, as shown at 106, because some of the input power would be consumed to overcome the inertia of elements connected to the input. During the inertia phase, the OCC would be stroked in preparation for the torque transfer phase. The commanded pressure to the OCC would be elevated to a high pressure, $P_{boost}$, for a short interval, $t_{boost}$, to rapidly fill the cylinder with fluid and move the piston to the stroke position, as shown at 108. Then, the commanded pressure would be maintained at a pressure near the stroke pressure. In FIG. 3, the actual pressure is shown equal to the stroke pressure at 110, which would keep the piston stroked but not apply any torque.

Once the input speed reaches the correct multiple of the output speed at 112, the torque transfer phase begins. During the torque transfer phase, the commanded pressure to the OGC would be gradually reduced 114 while the commanded pressure to the OCC is gradually increased 116. Ideally, the torque capacity of the two clutches would be coordinated such that the input speed remains constant 118 and the output torque gradually increases 120. The torque transfer phase is complete when the OCC pressure is above its holding pressure 122 and the OGC pressure is below its stroke pressure 124. The commanded pressure of the OCC would then be further increased to provide some margin over the holding pressure as shown at 126.

While FIG. 3 illustrates an ideal system without noise factors, the actual pressure will generally only approximate the stroke pressure. In the absence of a feedback signal, it is difficult to determine if the commanded pressure has being achieved.

Figure 4:
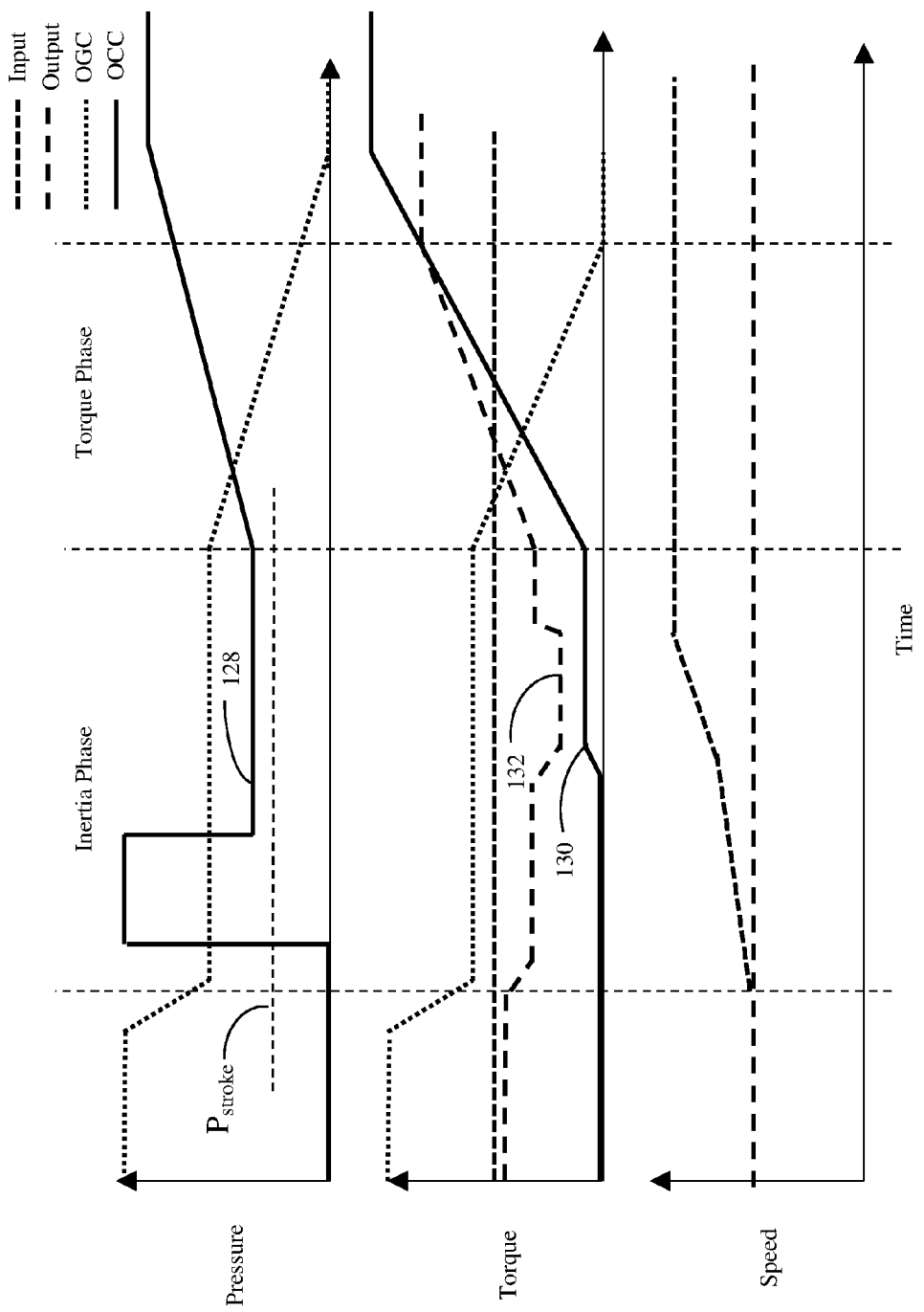
FIG. 4 is a graph illustrating a downshift under open loop clutch pressure control in which the oncoming clutch pressure is set too high.
Figure 5:
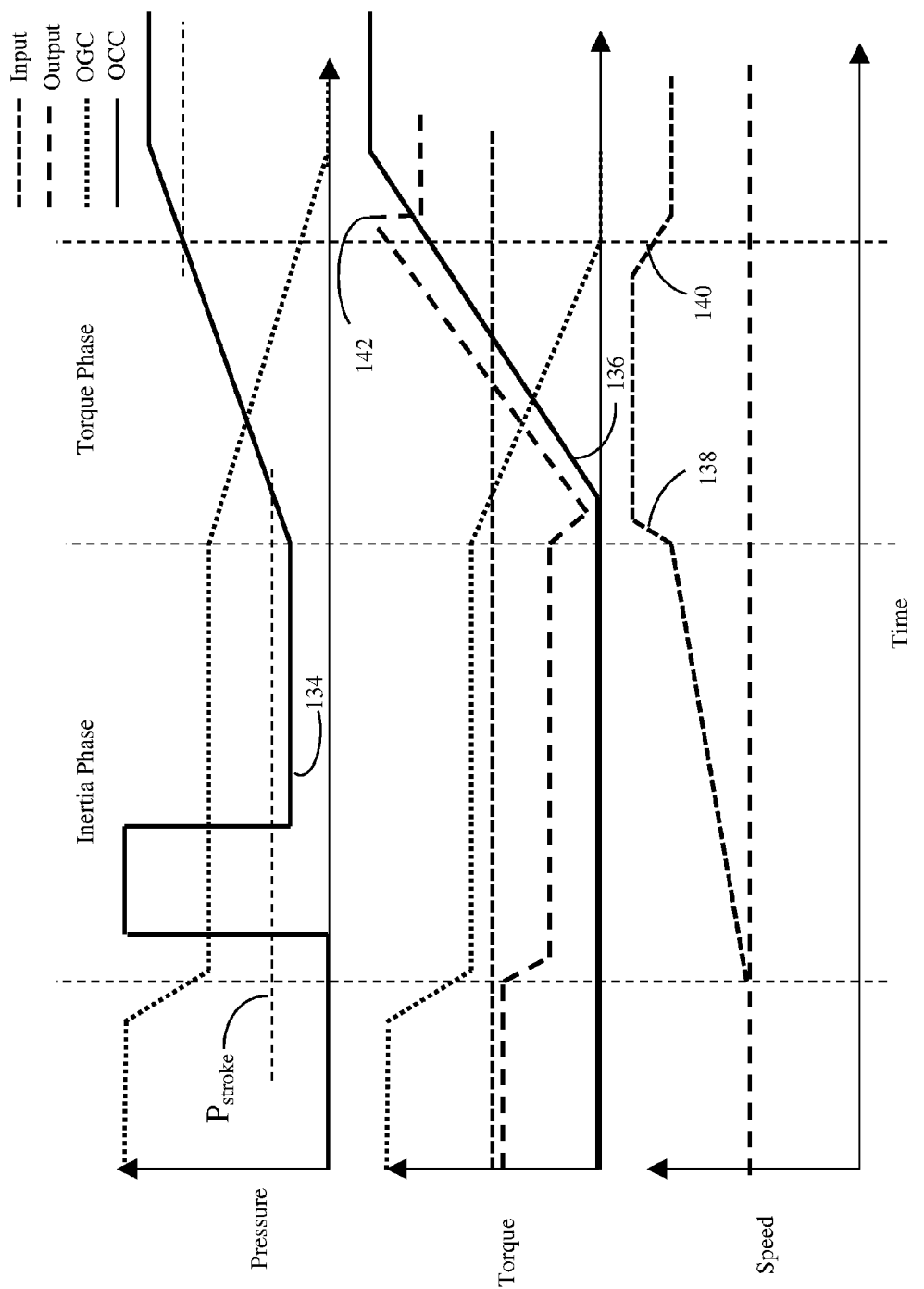
FIG. 5 is a graph illustrating a downshift under open loop clutch pressure control in which the oncoming clutch pressure is set too low.

FIGS. 4-5 illustrate the potential problems associated with the noise factors and subsequent pressure control errors in an open loop control strategy. FIG. 4 illustrates an effect of accidentally commanding an OCC pressure above the stroke pressure during the inertia phase 128. Once the OCC is stroked, the torque capacity increases to a positive value 130. Since the speed ratio at this point is below the speed ratio of the destination gear, torque capacity of the OCC produces a drop in the output torque 132. The vehicle occupants perceive this fluctuation in output torque as a rough and jerky shift event.

FIG. 5 illustrates an effect of accidentally commanding an OCC pressure below the stroke pressure 134. In this circumstance, the OCC is not fully stroked by the beginning of the torque transfer phase. As the commanded pressure of the OCC is increased in the torque transfer phase, there is a delay before the OCC torque capacity begins to increase 136. During this delay period, the input speed continues to increase above the speed ratio of the destination gear as shown at 138. This is called an engine flare. Eventually, the OCC torque capacity increases enough to bring the input speed back to the desired level 140. The output torque changes suddenly 142 when the input speed returns to the destination gear speed ratio which occupants perceive as a rough and jerky shift event.

Figure 6:
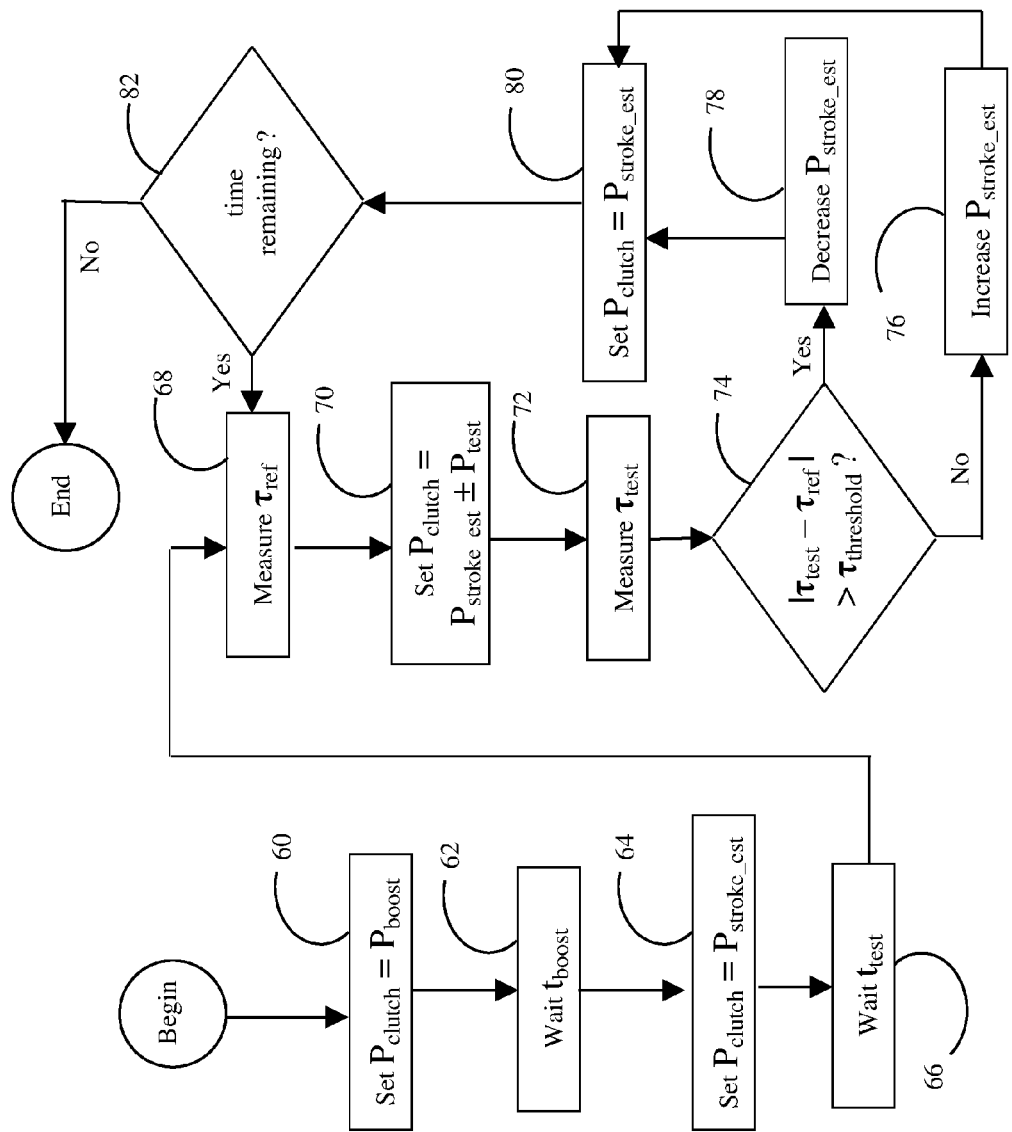
FIG. 6 is a flow chart illustrating a first embodiments of a closed loop pressure control algorithm.

FIG. 6 illustrates a flow chart of a control system for a transmission using closed loop control during a ratio shift. As those of ordinary skill in the art will understand, the functions represented by the flowchart blocks can be performed by software and/or hardware. Also, the functions can be performed in an order or sequence other than that illustrated in FIG. 6. Similarly, one or more of the steps or functions can be repeatedly performed although not explicitly illustrated. Likewise, one or more of the representative steps of functions illustrated can be omitted in some applications. In one embodiment, the functions illustrated are primarily implemented by software instructions, code, or control logic stored in a computer-readable storage medium and if executed by a microprocessor based computer or controller such as the controller 50.

FIG. 6 is a flow chart for one embodiment of the present disclosure for using a torque sensor for detecting improper stroke and using closed loop control during a ratio shift. Initially when a ratio shift is requested, the controller raises the OCC pressure to a boost pressure $P_{boost}$ for a boost time $t_{boost}$ in order to quickly move the piston to a substantially stroked position, as represented by blocks 60 and 62. The boost pressure $P_{boost}$ is a clutch control parameter significantly above the stroke pressure $P_{stroke}$. For example, the boost pressure can be the maximum available pressure based on limits of the solenoid. The boost time $t_{boost}$ is a clutch control parameter calculated to be long enough to substantially stroke the clutch and short enough that the clutch does not prematurely transmit torque.

Then, the controller commands the OCC to an estimated stroke pressure $P_{stroke\_est}$ and waits for a period $t_{test}$ calculated to be long enough for the piston to reach an equilibrium position as represented by blocks 64 and 66. Both $P_{stroke\_est}$ and $t_{test}$ are clutch control parameters. Initial values for all clutch control parameters can be established experimentally based on vehicle testing and can be adjusted adaptively during vehicle operation. In this illustrative example, $P_{stroke\_est}$ is adjusted adaptively.

At 68, the controller records a reference reading $\tau_{ref}$ from a torque sensor 40. The torque sensor can measure the torque on the output shaft as shown in FIG. 1, the input shaft, or any other element that transmits torque in the destination gear. At 70, the controller commands a pressure variation $P_{test}$ above or below the estimated stroke pressure $P_{stroke\_est}$. The incremental pressure $P_{test}$ is calculated to be enough of a pressure variation to generate a change in the torque measured by the torque sensor 40 if the clutch is fully stroked. However, the pressure variation can be small enough that the change in torque would not be objectionable or even noticeable to the vehicle occupants.

At 72, the controller records a second reading $\tau_{test}$ from the torque sensor 40. At 74, the controller compares the two torque readings, $\tau_{ref}$ and $\tau_{test}$, to determine if the difference between $\tau_{ref}$ and $\tau_{test}$ differ by more than a threshold amount $\tau_{threshold}$. The threshold amount $\tau_{threshold}$ is calculated to be large enough that short term variations due to noise factors are not erroneously attributed to the change in commanded pressure. If the two pressures, $\tau_{ref}$ and $\tau_{test}$, differ by less than the threshold amount $\tau_{threshold}$, this is indicative that the piston was not fully stroked. If the piston is not fully stroked, then the estimated stroke pressure is increased as represented by block 76. On the other hand, if the two pressures, $\tau_{ref}$ and $\tau_{test}$, differ by more than the threshold amount $\tau_{threshold}$, this is indicative that the piston was fully stroked. If the piston is fully stroked, then the estimated stroke pressure is decreased, as represented by block 78. At 80, the controller commands the revised estimated stroke pressure.

Finally, if there is time remaining before the end of the inertia phase, another adjustment is performed. Otherwise, the process ends and the revised estimated stroke pressure is utilized in future shift events involving that OCC.

Figure 7:
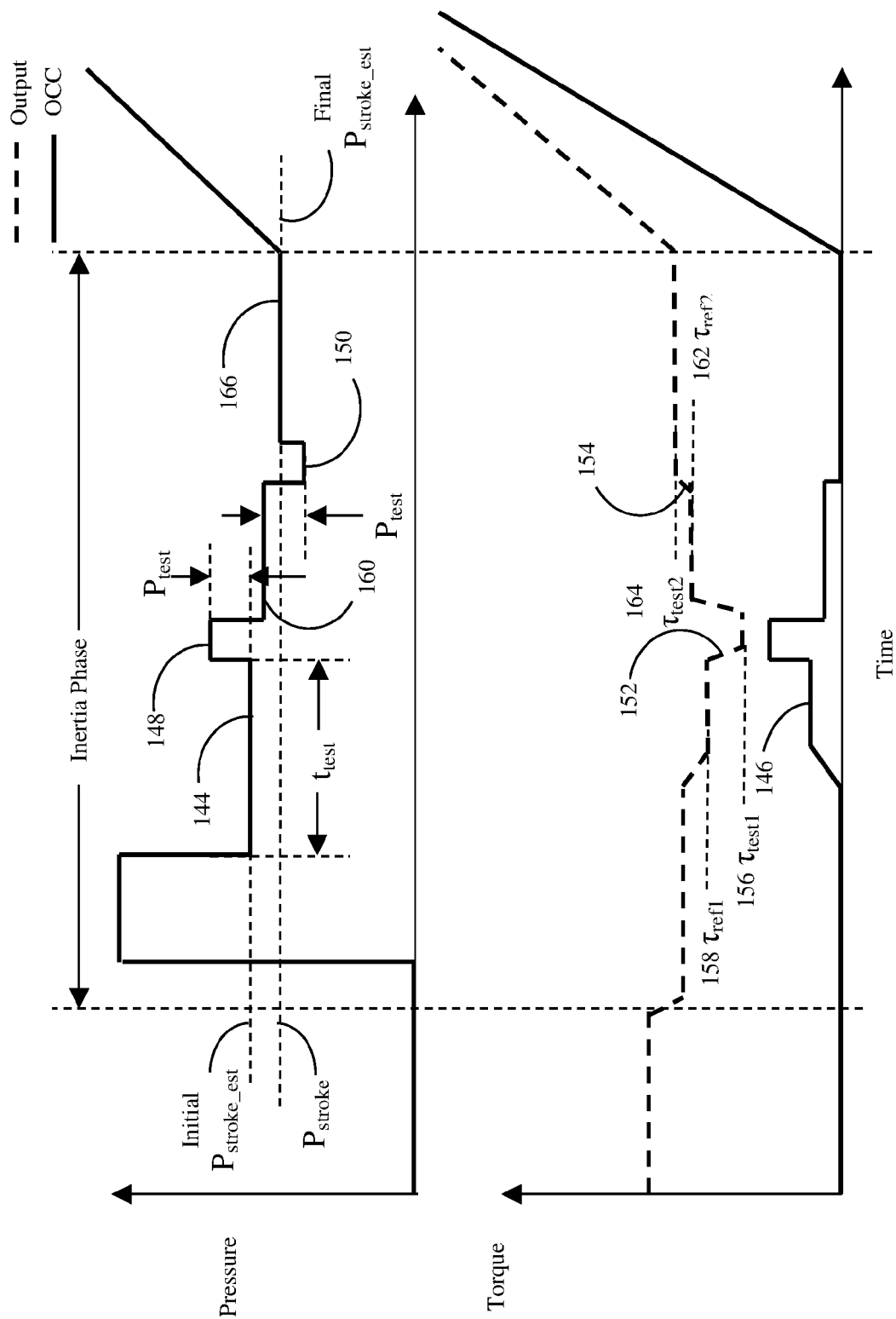
FIG. 7 is a graph illustrating a downshift under the closed loop clutch pressure control system of FIG. 6 in which the initial oncoming clutch pressure is set too high.

FIG. 7 illustrates the results of utilizing the control strategy of FIG. 6 when the initial estimated stroke pressure is higher than a required stroke pressure as shown at 144. When the estimated stroke pressure is too high, the clutch is fully stroked and has positive torque capacity 146. When the clutch is fully stroked, the upward 148 and downward 150 perturbations in commanded pressure produce measurable changes in torque as shown at 152 and 154 which are detectable by the torque sensor. For example, the upward perturbation 148 results in the measured torque reading $\tau_{test1}$ 156. The torque perturbation is compared to a reference torque value $\tau_{ref1}$ 158. If the difference between the measured torque readings, $\tau_{test1}$ and $\tau_{ref1}$, is greater than a threshold amount, then the estimated stroke pressure is decreased. The controller commands this decreased stroke pressure 160.

Prior to a second perturbation 150, a revised reference torque value $\tau_{ref2}$ 162 is measured. Following the perturbation, a second torque reading $\tau_{test2}$ 164 is measured. Even though the new commanded pressure is below the required stroke pressure, the torque difference still exceeds the threshold, resulting in another downward adjustment. The commanded pressure is set to the new adjusted value as show at 166. Please note, the perturbations in pressure and torque may be exaggerated for illustrative purposes.

Figure 8:
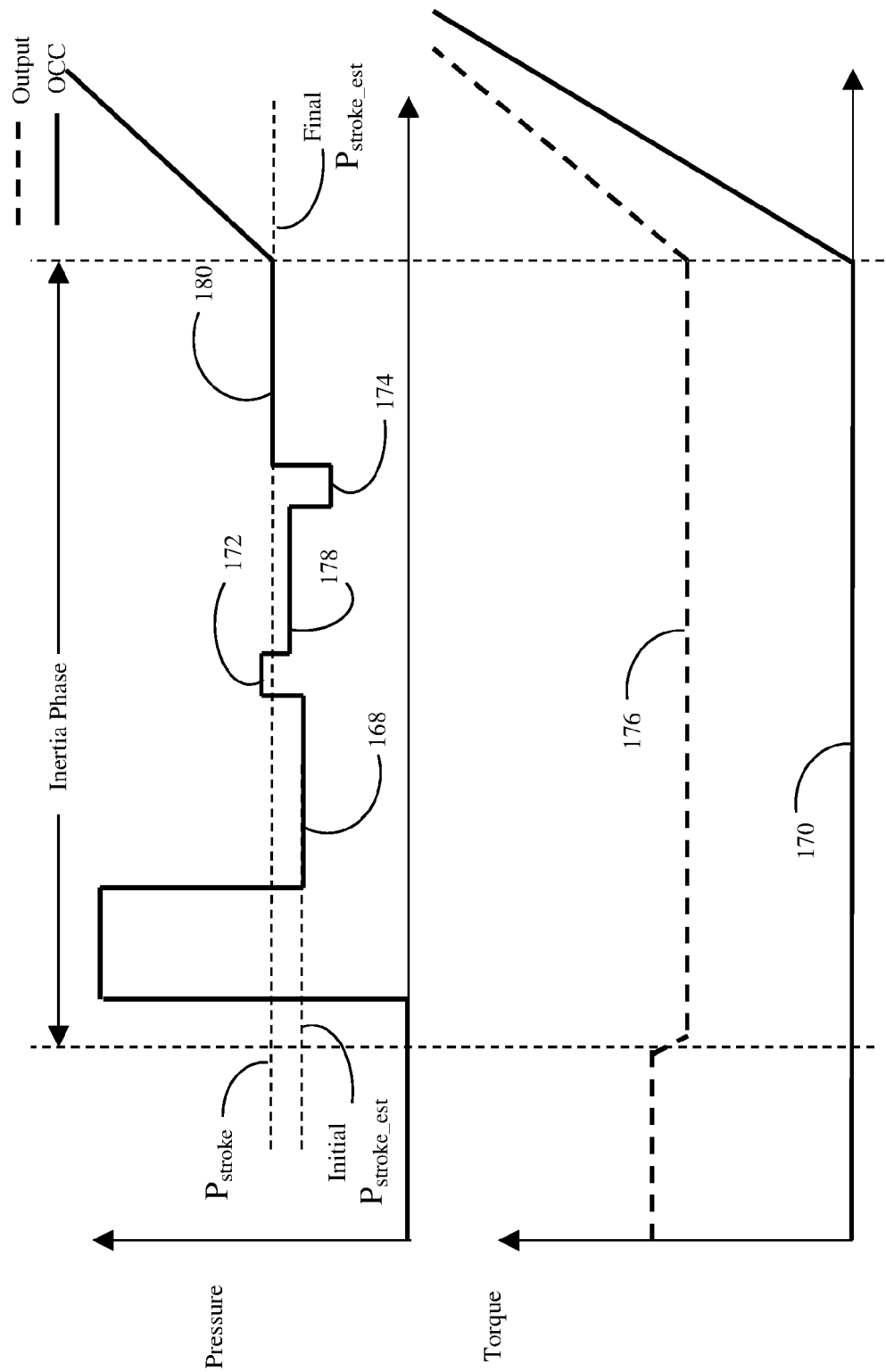
FIG. 8 is a graph illustrating a downshift under the closed loop clutch pressure control system of FIG. 6 in which the initial oncoming clutch pressure is set too low.

FIG. 8 illustrates the results when the initial estimate of stroke pressure is below the actual stroke pressure as shown at 168. When the estimated stroke pressure is too low, the clutch is not fully stroked and has zero torque capacity 170. In this unstroked condition, perturbations in commanded pressure do not produce a measurable change. For example, as illustrated, upward pressure pulse 172 and downward pressure pulse 174 do not affect output torque 176. Consequently, then the estimated stroke pressure can be increased after each perturbation. The controller commands this increased stroke pressure as shown at 178 and 180.

Figure 9:
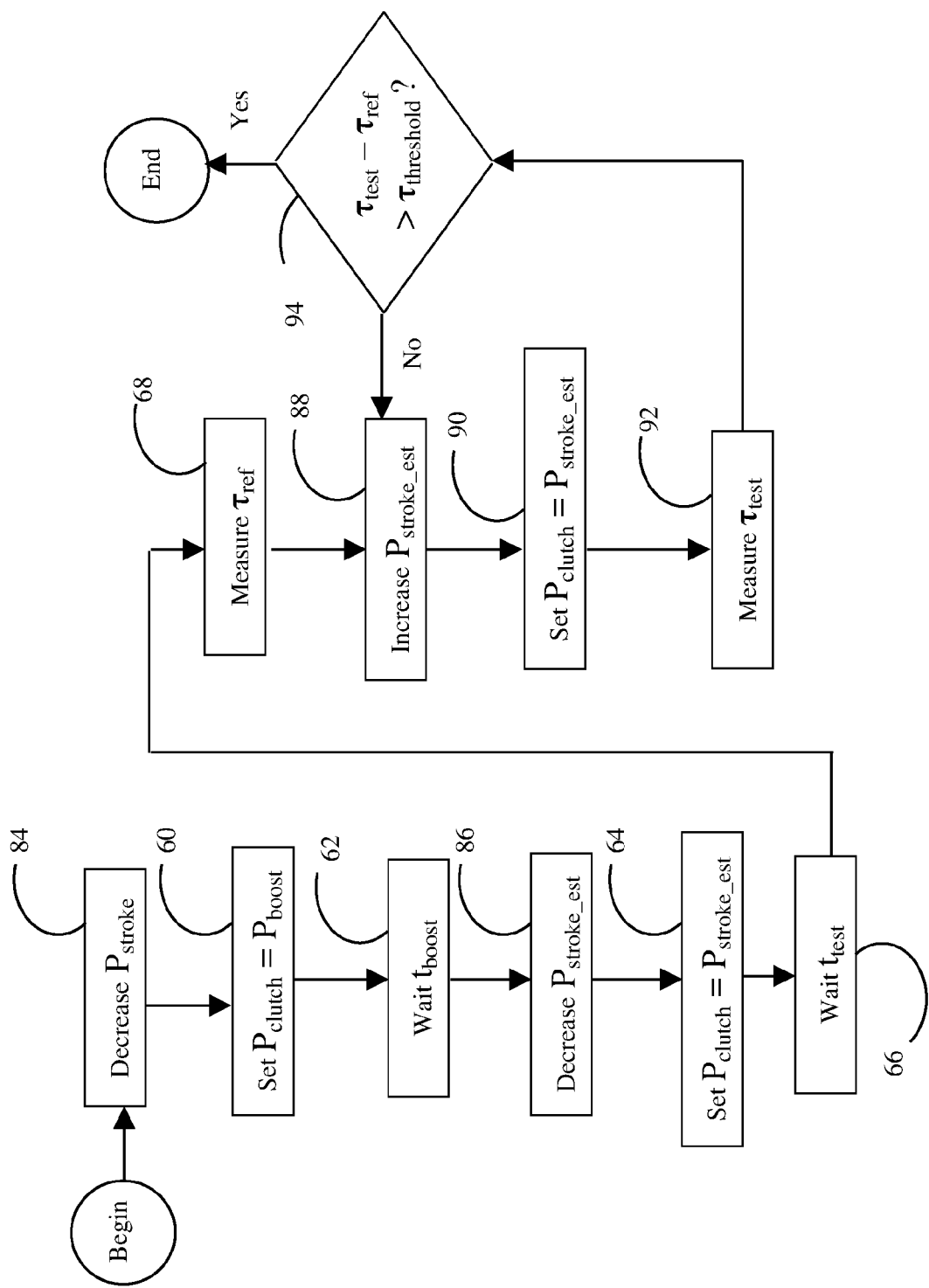
FIG. 9 is a flow chart illustrating a second embodiments of a closed loop pressure control algorithm.

FIG. 9 is a flow chart for another embodiment of the present disclosure where the initial estimate of the stroke pressure is intentionally set slightly below the required stroke pressure and gradually increased until a measurable change is detected. Blocks 60 through 68 are identical to the previously described embodiment except that the initial estimate is decreased from the previous value at block 86. Blocks 88, 90, 92, and 94 form a loop in which the estimated stroke pressure and the commanded pressure is gradually increased until the torque sensor indicates a change in measured torque. The increment added to $P_{stroke\_est}$ in each iteration can be small compared to the increment used at blocks 76 and 78 of FIG. 6 or block 86 of FIG. 9.

Figure 10:
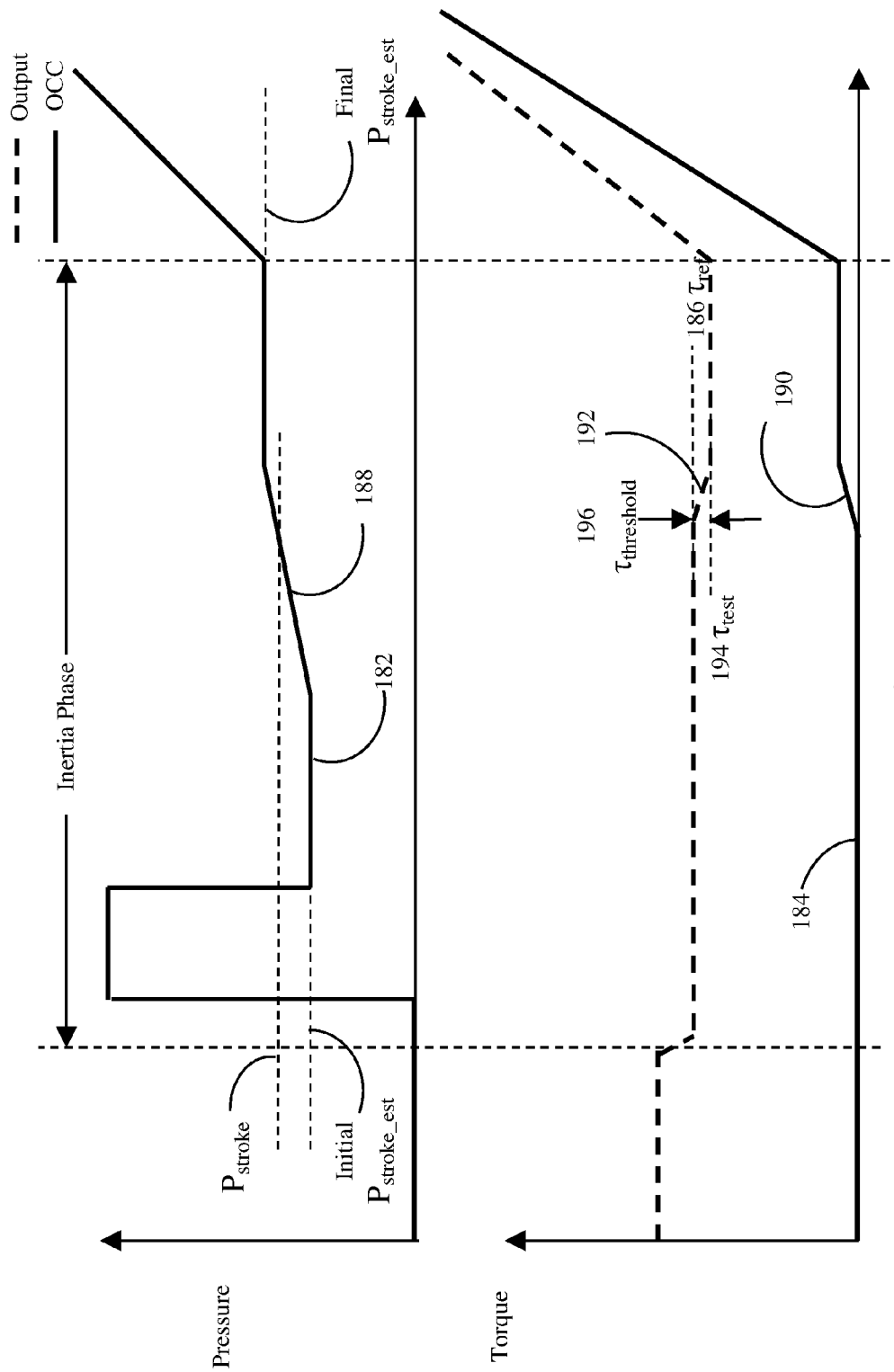
FIG. 10 is a graph illustrating a downshift under the closed loop clutch pressure control system of FIG. 9.

FIG. 10 illustrates the results of utilizing the control strategy described in FIG. 9. After the boost phase, the clutch pressure is set to a value below the stroke pressure at 182. Because the clutch is not fully stroked, the clutch torque capacity is zero 184. The reference torque value $\tau_{ref}$ 186 is measured. Then, the commanded pressure is gradually increased, as shown at 188. Once the commanded pressure reaches the stroke pressure, the clutch torque capacity will begin to increase above zero, as shown at 190, and the output torque will begin to decrease, as shown at 192. In each iteration, a new test torque $\tau_{test}$ 194 is measured until the difference between the measured torque readings, $\tau_{test}$ and $\tau_{ref}$, is greater than a threshold amount $\tau_{threshold}$ 196.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a transmission comprising: adjusting a predetermined oncoming clutch (OCC) pressure based on if a change in output torque is measured in response to a test OCC clutch pressure being varied from the predetermined OCC pressure.

2. The method of claim 1 further comprising measuring the change in clutch torque with a torque sensor at a torque transmitting element in the transmission.

3. The method of claim 1 wherein the predetermined OCC pressure is adjusted if the change in output torque is greater than a threshold.

4. The method of claim 3 further comprising setting the predetermined OCC pressure greater than a required stroke pressure.

5. The method of claim 4 further comprising adjusting the predetermined OCC pressure to a second OCC pressure being less than the predetermined OCC pressure if the change in output torque is greater than the threshold.

6. The method of claim 1 wherein the predetermined OCC pressure is adjusted until the change in output torque is measured.

7. The method of claim 6 further comprising setting the predetermined OCC pressure less than a required stroke pressure.

8. The method of claim 7 further comprising adjusting the predetermined OCC pressure by continually increasing the predetermined OCC pressure until the change in output torque is measured.

9. The method of claim 1 further comprising adjusting the predetermined OCC pressure in advance of a torque phase of a ratio-shift.

10. A method for controlling a transmission comprising: varying an oncoming clutch pressure from a predetermined stroke pressure during an inertia phase of a ratio-shift;
adjusting the predetermined stroke pressure based on if a change in output torque is measured in response to the oncoming clutch pressure being varied.

11. The method of claim 10 wherein the predetermined stroke pressure is adjusted if the change in output torque is greater than a threshold.

12. The method of claim 10 wherein varying the oncoming clutch pressure includes pulsing the oncoming clutch pressure above or below the predetermined stroke pressure.

13. The method of claim 10 wherein varying the oncoming clutch pressure includes gradually increasing the oncoming clutch pressure until the measured torque transmitted by at least one of an input shaft and an output shaft changes.

14. A computer-program product embodied in a non-transitory computer readable medium that is programmed for controlling a transmission shift event and comprising instructions for:
adjusting a predetermined oncoming clutch (OCC) pressure based on if a change in output torque is measured in response to a test OCC clutch pressure being varied from the predetermined OCC pressure.

15. The computer-program product of claim 14 wherein the predetermined OCC pressure is adjusted if the change in output torque is greater than a threshold.

16. The computer-program product of claim 14 further comprising instructions for setting the predetermined OCC pressure greater than a required stroke pressure.

17. The computer-program product of claim 16 further comprising instructions for adjusting the predetermined OCC pressure to a second test OCC pressure being less than the predetermined OCC pressure if the change in output torque is greater than a threshold.

18. The computer-program product of claim 14 wherein the predetermined OCC pressure is adjusted until the change in output torque is measured.

19. The computer-program product of claim 18 further comprising setting the predetermined OCC pressure less than a required stroke pressure.

20. The computer-program product of claim 19 further comprising instructions for adjusting the predetermined OCC pressure by continually increasing the predetermined OCC pressure until the change in output torque is measured.

* * * * *